United States Patent
Franz

(10) Patent No.: US 12,147,049 B2
(45) Date of Patent: Nov. 19, 2024

(54) DEVICE FOR GENERATING AND DISPLAYING AN IMAGE ON AN OBSERVATION FIELD USING A DIFFRACTION-INFLUENCED WAVEGUIDE

(71) Applicant: OQmented GmbH, Itzehoe (DE)

(72) Inventor: Stefan Franz, Jena (DE)

(73) Assignee: OQmented GmbH, Itzehoe (DE)

( * ) Notice: Subject to any disclaimer, the term of this patent is extended or adjusted under 35 U.S.C. 154(b) by 0 days.

(21) Appl. No.: 18/543,376

(22) Filed: Dec. 18, 2023

(65) Prior Publication Data

US 2024/0210701 A1    Jun. 27, 2024

(30) Foreign Application Priority Data

Dec. 21, 2022  (DE) ............... 10 2022 134 417.7

(51) Int. Cl.
*G02B 27/01* (2006.01)
*G02B 26/08* (2006.01)

(52) U.S. Cl.
CPC .... *G02B 27/0172* (2013.01); *G02B 2027/011* (2013.01)

(58) Field of Classification Search
CPC ............ G02B 27/0172; G02B 2027/011
USPC ............................................. 359/630
See application file for complete search history.

(56) References Cited

U.S. PATENT DOCUMENTS

2002/0101643 A1   8/2002   Kobayashi
2022/0197034 A1   6/2022   Noui et al.

FOREIGN PATENT DOCUMENTS

| DE | 10 2017 211 932 A1 | 1/2019 |
| DE | 10 2018 201 525 A1 | 7/2019 |
| DE | 10 2019 219 520 A1 | 6/2021 |
| DE | 10 2021 116 151 B3 | 6/2022 |
| WO | WO 2021/122948 A1 | 6/2021 |

*Primary Examiner* — Joseph P Martinez
*Assistant Examiner* — Grant A Gagnon
(74) *Attorney, Agent, or Firm* — Christensen, Fonder, Dardi & Herbert PLLC

(57) ABSTRACT

A device for generating and displaying an image on an observation field provided for overlaying information and images, including at least one light source for emitting at least one divergent light bundle, a microscanner for variable deflection of the at least one light bundle in direction of the observation field, at least one waveguide which is arranged in a beam path of the at least one light bundle between the at least one light source and the microscanner, and at least one diffractive element for collimating the at least one light bundle. The microscanner has at least one axis of rotation for a rotational oscillating movement for deflecting the at least one light bundle, and the at least one diffractive element is arranged on or in the at least one waveguide.

12 Claims, 7 Drawing Sheets

DEVICE FOR GENERATING AND DISPLAYING AN IMAGE ON AN OBSERVATION FIELD USING A DIFFRACTION-INFLUENCED WAVEGUIDE

PRIORITY CLAIM

The present application claims priority to German Patent Application No. 10 2022 134 417.7, filed on Dec. 21, 2022, which said application is incorporated by reference in its entirety herein.

FIELD OF THE INVENTION

The invention is directed to a projection device for generating and displaying an image on an observation field which is provided for projecting augmented reality and which can be in particular a lens of eyeglasses or a retina of a user of augmented reality goggles.

BACKGROUND OF THE INVENTION

Augmented reality (AR) refers to the computer-based augmentation of the perception of reality which operates on at least one of the human sensory modalities. However, AR is often understood to mean merely the visual display of information, namely, the supplementing of pictures or videos by overlaying or superimposing additional, computer-generated information and/or virtual objects. In particular, a frequent application of AR consists in the visual display or projection of images, user interfaces or information, such as directions, weather information or news, and is increasingly applied in AR eyeglasses or goggles, as they are called, which can display images, user interfaces or information directly on the lenses of the eyeglasses or on the retina of a user.

A microscanner (also known as MEMS, short for microelectromechanical system) can be used to project images or textual information. A light bundle which is generated by a light source arranged, for example, in a temple of eyeglass frames and which is subsequently shaped is deflected onto the MEMS scanner. The MEMS scanner can then scan the light bundle so that an image is generated on an observation field. An imaging system of this kind with a MEMS scanner requires comparatively few optical elements so that compact, inexpensive projectors can be realized. For AR applications, a projector must achieve a very high optical resolution and consume very little power. Therefore, for lack of alternatives, edge emitters are often used as light sources. However, these edge emitters emit a strongly divergent, elliptically-shaped light bundle which must be collimated.

A MEMS scanner is described, for example, in DE 10 2021 116 151 B3. The MEMS scanner disclosed therein can execute oscillations rotating simultaneously around two resonant oscillation axes in order to bring about a nonlinear Lissajous projection in an observation field by deflecting a light beam incident upon a deflecting element during the oscillations.

As a result of the oscillations, a field of view (FOV) is scanned with high frequencies in a scanning pattern corresponding to a Lissajous figure. Accordingly, in contrast to conventional raster scanning methods which scan the FOV periodically from top to bottom with maximum resolution, hundreds of partial images can be processed simultaneously and a more fluid motion depiction is enabled. Moreover, artifacts in the three-dimensional perception of rapidly moving objects are sharply reduced.

The scanning of a light bundle emitted by a laser diode over an observation field is also known as laser beam scanning (LBS).

A display for a near-eye display of images is disclosed in WO 2021/122948 A1. The display comprises a light source for emitting light in direction of a waveguide, the waveguide, and a first optical element which is provided on the waveguide and is configured in such a way that it receives light and couples it into the waveguide. LBS can be used to display the images.

Data glasses and a projection device for data glasses and a method for operating the projection device are known from DE 10 2017 211 932 A1 for beam shaping and for collimation. The disclosed projection device has a light source for emitting at least one light beam, a deflection element for projecting an image on a retina of a user, a reflective element for reflecting the light beam onto the deflection element, and an adaptive optical element for adaptive modification of at least one beam parameter. If necessary, the projection device can also have collimating elements for the light beam.

A further imaging/display device disclosed in DE 10 2019 219 520 A1 comprises a light source, a deflection element and a lens arrangement arranged between the light source and the deflection element. The lens arrangement has two cylindrical lenses with which different beam profiles can be generated in two axes. A light beam emitted by the light source can be collimated and shaped through the cylindrical lenses.

A further projection device for data glasses is known from DE 10 2018 201 525 A1. This further projection device has a light source for emitting a light beam, at least one deflection element for projecting an image on a retina of a user, and a reflective element for reflecting the light beam on a first deflection element. The projection device further has a light guide between the light source and the reflective element. The light guide serves to guide the light emitted by the light source to a deflection element. Further, the image quality is improved by the light guide, since modes which do not correspond to a fundamental mode of the light guide are filtered out of the light beam when the light beam is coupled in so that less interference light reaches the beam path of the light beam.

A separate optical element for collimating the light bundle emitted by a light source is always provided in the described projection devices. Since the installation space in AR goggles is limited and design aspects play a significant role in AR goggles, it is disadvantageous to integrate many optical elements with relatively large path lengths in AR goggles, such as telescopic arrangements with a plurality of lenses. Moreover, the number of component parts also disadvantageously affects the adjustment effort during assembly of the projection device, which increases as the quantity of component parts increases.

SUMMARY OF THE INVENTION

Therefore, it is the object of the invention to find a novel possibility for generating images and displaying images on an observation field for AR data projection which has a high optical resolution and low power consumption while using few optical elements and little installation space.

This object is met by means of a device for generating and displaying an image on an observation field provided for overlaying information and images, comprising at least one light source for emitting at least one divergent light bundle, a microscanner for variable deflection of the at least one light bundle in direction of the observation field, at least one waveguide which is arranged in a beam path of the at least one light bundle between the at least one light source and the microscanner, and at least one diffractive element for collimating the at least one light bundle. The microscanner has at least one axis of rotation for a rotational oscillating movement for deflecting the at least one light bundle. The at least one diffractive element is arranged on or in the waveguide.

Within the meaning of the invention, the generation and display of an image means the generation and display of an image, of a plurality of images or of a series of images. User interfaces or information such as directions, weather information or news can also be displayed on the observation field with a device according to the invention.

The observation field is advantageously at least one optical surface, for example, at least one beamsplitter or a holographic optical element (HOE), which is arranged in an eyeglass lens of AR goggles or on a windshield of a motor vehicle. Alternatively, the observation field is at least a retina of a user.

The at least one diffractive element is an optical element on which microstructures are applied. A phase of the at least one light bundle and an intensity pattern of the light bundle can be modulated on the diffractive elements. The modulation is carried out through diffraction of the at least one light bundle at the diffractive element. Accordingly, the at least one light bundle can be collimated, deflected, shaped and/or split and astigmatisms of the at least one light bundle can be influenced, preferably eliminated.

The waveguide is substantially plate-shaped and comprises a material through which the at least one light bundle emitted by the light source can propagate. The light bundle preferably propagates through total internal reflection at the outer sides of the waveguide by the light bundle. To this end, the light bundle must be coupled into the waveguide at an angle that is greater than an angle of total internal reflection. The angle of total internal reflection depends on the material from which the waveguide is made. The waveguide may comprise a plurality of layers or can comprise only one layer. The waveguide is preferably a glass plate. In a particularly preferable manner, the waveguide is an eyeglass lens of augmented reality goggles or the windshield of a motor vehicle.

By mounting the at least one diffractive element on or in the waveguide, the installation space required for the device for generating and displaying an image on an observation field provided for overlaying information and images is considerably reduced, since no additional optical elements are required for collimation, deflection, shaping, influencing astigmatisms and/or splitting.

Further, a cover glass which protects the outside of the waveguide and/or the at least one diffractive element against external influences can be arranged on the waveguide, particularly on outer sides of the waveguide on which at least one diffractive element is arranged. It is particularly preferable that a cover glass is arranged on both outer sides of the waveguide.

The at least one diffractive element is advantageously formed as an optical grating. The diffractive elements can advantageously be formed as amplitude gratings and/or as phase gratings, particularly blazed gratings. Further, a slanted edge grating, zone plates and/or holographic gratings (HOE), for example, can also be used as diffractive elements. Optical gratings can either be arranged on a surface of the waveguide or inserted directly into the diffractive element, as a result of which costs and outlay in the production of the device for generating and displaying an image on an observation field remain low or decrease, since no additional optical elements are needed in the beam path of the at least one light bundle.

The at least one diffractive element can be configured to shape a beam cross section of the at least one light bundle in order to reduce an ellipticity of the at least one light bundle. It is necessary to reduce the ellipticity of the at least one light bundle in particular to achieve a very good optical resolution because additional imaging errors can be produced by light bundles with an elliptical beam cross section.

The at least one diffractive element can be configured to influence astigmatisms of the at least one light bundle. In particular, the elimination of astigmatisms of the at least one light bundle is useful for improving the optical resolution.

The at least one diffractive element should advantageously have an anamorphic effect and should collimate and rectify the divergent beam bundle emitted by the light source, i.e., should eliminate astigmatisms and reduce an ellipticity of the beam cross section.

For collimation, optionally for deflection, for influencing astigmatisms and for shaping the beam cross section of the at least one light bundle, either a plurality of diffractive elements which each have one or more of the functions or an individual diffractive element which has all of the functions can be arranged between a light source and the microscanner on or in the waveguide. For example, a diffractive element for collimating the at least one light bundle and at least one further diffractive element for shaping and deflecting the at least one light bundle can be arranged between the at least one light source and the microscanner.

An additional optical element which is configured to reduce a divergence of the at least one light bundle is preferably arranged upstream of the at least one diffractive element in the beam path of the at least one light bundle. Accordingly, the requirements for the at least one diffractive element can be relaxed. The additional optical element can be configured to be diffractive or refractive. It can either be arranged directly at the light source or between the light source and the diffractive element in the beam path of the at least one light bundle.

At least one of the diffractive elements arranged on the waveguide can preferably be configured as an in-coupling element or out-coupling element through which the at least one light bundle can be coupled into or out of the waveguide. One or more in-coupling elements and out-coupling elements can be provided at the waveguide. The in-coupling elements and out-coupling elements can also be configured as refractive optical elements.

The at least one light source is advantageously formed as edge emitter, surface emitter or as fiber-coupled laser light source. Surface emitters and fiber-coupled light sources have the advantage that the light bundles emitted by these light sources are generally less divergent than the light bundles emitted by edge emitters. On the other hand, the acquisition costs of surface emitters and fiber-coupled light sources are generally higher than that of edge emitters. In a particularly advantageous manner, a laser diode or a fiber-coupled laser can be used as light source.

The at least one light source can be configured to emit a plurality of light bundles with spectral compositions differing from one another in pairs.

Alternatively, the at least one light source can be formed to emit a plurality of light bundles of like spectral composition. To this end, the light source can have a plurality of individual light sources at a given distance from one another. The distance between the light bundles emitted by the individual light sources can preferably be adjusted by a diffractive element. The use of a line light source is particularly sensible when the microscanner is formed to be rotatable around only one axis of rotation because an image can then be produced in two dimensions by simultaneously controlling the line light source and microscanner.

Further, a diffractive element can be arranged between the at least one light source and the microscanner, this diffractive element being configured in such a way that the light bundles with spectral compositions differing from one another in pairs or with like spectral composition which impinge on the diffractive element under angles differing from one another in pairs are combined to form a single light bundle.

The microscanner can be formed in particular as a microelectromechanical system (MEMS) and can be configured to bring about a nonlinear Lissajous projection in the observation field. The microscanner is formed to scan the light bundle over the observation field so that an image is generated on the observation field. By scanning the at least one light bundle along a Lissajous figure, hundreds of partial images can be processed simultaneously allowing a more fluid depiction of movement. Further, artifacts in the user's three-dimensional perception of rapidly moving objects are sharply reduced.

In a particularly advantageous manner, the microscanner is formed to be rotatable around exactly two axes of rotation orthogonal to one another and oscillates by its resonant frequency around the two rotational axes. The microscanner can also be formed rotatable around only one rotational axis and the light source is formed to emit a plurality of adjacently arranged light bundles in line shape.

The above-stated object is further met by augmented reality goggles comprising a device for generating and displaying images according to one of the embodiments described above.

BRIEF DESCRIPTION OF THE DRAWINGS

The invention will be described in more detail in the following through embodiment examples with reference to drawings. The drawings show.

DETAILED DESCRIPTION

Figure 1A:
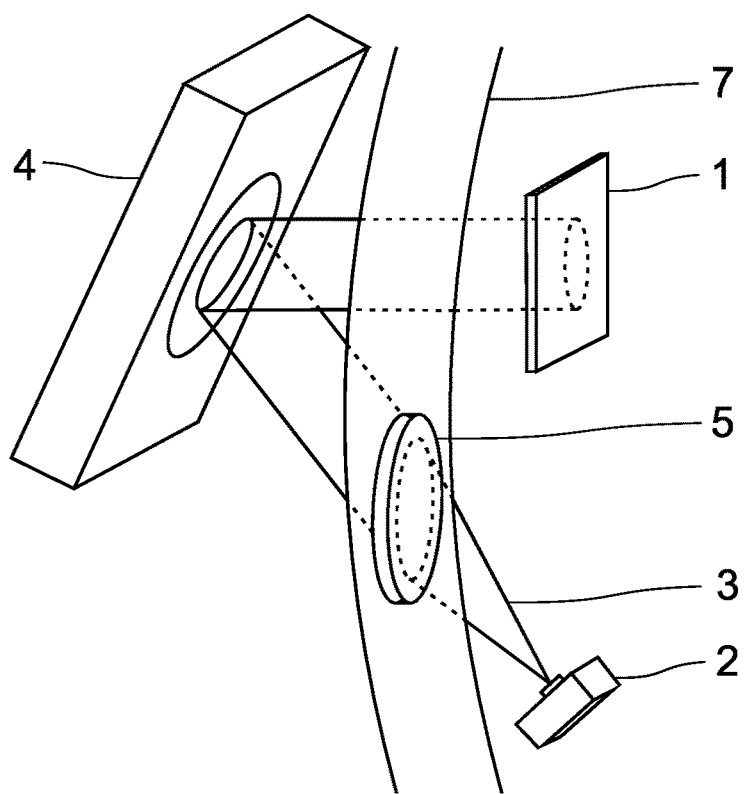
FIG. 1A a view of a first embodiment of a device for generating and displaying an image on an observation field, with a light source, a diffractive element arranged on a waveguide, a microscanner, and a beam path of a light bundle.

FIG. 1A shows a first embodiment of a device for generating and displaying an image on an observation field 1, with a light source 2 which emits a divergent light bundle 3, a microscanner 4 and a diffractive element 5. The diffractive element 5 is installed in a waveguide 7 and is circular. In the first embodiment example, the light source 2 is constructed as an area emitter and emits a light bundle 3 having a circular beam cross section. Accordingly, no additional diffractive elements 5 are needed for shaping a beam cross section of the light bundle 3. The light bundle 3 enters the waveguide 7 obliquely and impinges at an angle on the diffractive element 5 which is arranged in the beam path of the light bundle 3 between the light source 2 and the microscanner 4. The light bundle 3 is transmitted through the diffractive element 5 and is diffracted at the diffractive element 5. As a result of the diffraction at the diffractive element 5, the light bundle 3 is collimated. After the diffractive element 5, the light bundle 3 exits the waveguide 7 and impinges on the microscanner 4. The microscanner 4 deflects the light bundle 3 so that the light bundle 3 is scanned over the observation field 1 and an image is generated on the observation field 1.

In the first embodiment example, the observation field 1 is an optical surface, for example, a beamsplitter or a holographic optical element (HOE) which is installed in an eyeglass lens of AR goggles.

Figure 1B:
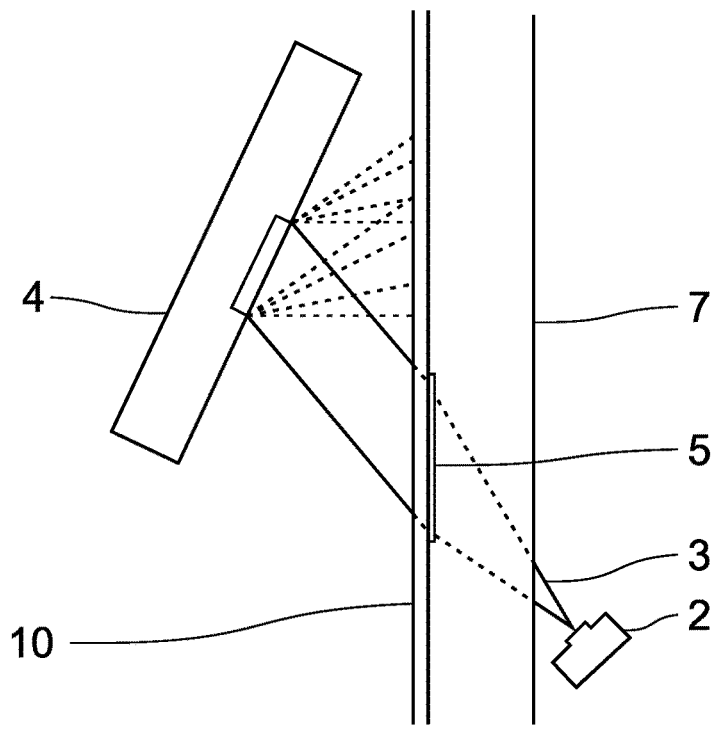
FIG. 1B a side view of a second embodiment of the device for generating and displaying an image on the observation field, with the light source, the diffractive element arranged on the waveguide, the microscanner and the beam path of the light bundle.

In the second embodiment of a device for generating and displaying an image on an observation field 1 shown in FIG. 1B, the diffractive element 5 is arranged inside of the waveguide 7 in contrast to the embodiment shown in FIG. 1A on the outer side of the waveguide 7. Here again, the light bundle 3 is collimated through diffraction at the diffractive element 5. The beam paths which can be taken by the light bundle 3 after being deflected by means of the microscanner 4 are indicated by dashed lines. The area in which the microscanner 4 deflects the light bundle 3 depends on the position of the observation field 1.

A cover glass 10 is arranged on the outer side of the waveguide 7 facing the microscanner 4 in order to protect the waveguide 7 and the diffractive element 5 against external factors.

The waveguide 7 is substantially plate-shaped; that is, a thickness of the waveguide 7 is substantially less than a width of the waveguide 7. The waveguide 7 can be curved as is shown in FIG. 1A or can have outer sides extending in a straight line as is shown in FIG. 1B.

Figure 2:
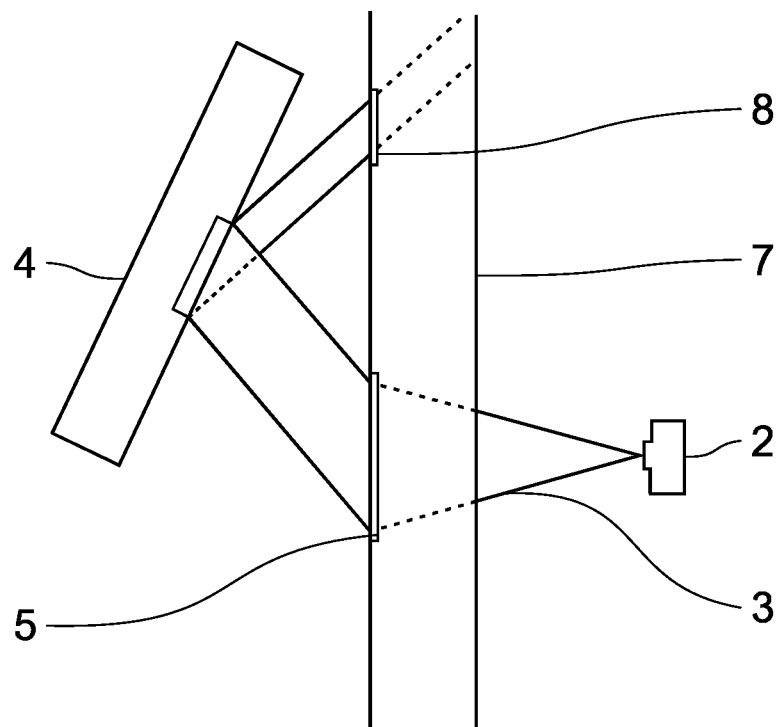
FIG. 2 a side view of a third embodiment of the device for generating and displaying an image on the observation field, with the light source, the diffractive element arranged on the waveguide, the microscanner and the beam path of the light bundle.

FIG. 2 shows a third embodiment of the device for generating and displaying an image on the observation field 1 with the light source 2, the diffractive element 5 arranged on the waveguide 7, the microscanner 4 and the beam path of the light bundle 3. In this case, the light bundle 3 emitted by the light source 2 impinges perpendicularly on the waveguide 7, enters the waveguide 7 and, after exiting the waveguide 7, is deflected in direction of the microscanner 4 and collimated through the diffractive element 5. The light bundle 3 is deflected by the microscanner 4 in direction of an in-coupling element 8. The in-coupling element 8 is configured to couple the light bundle 3 coming from the microscanner 4 into the waveguide 7.

Figure 3:
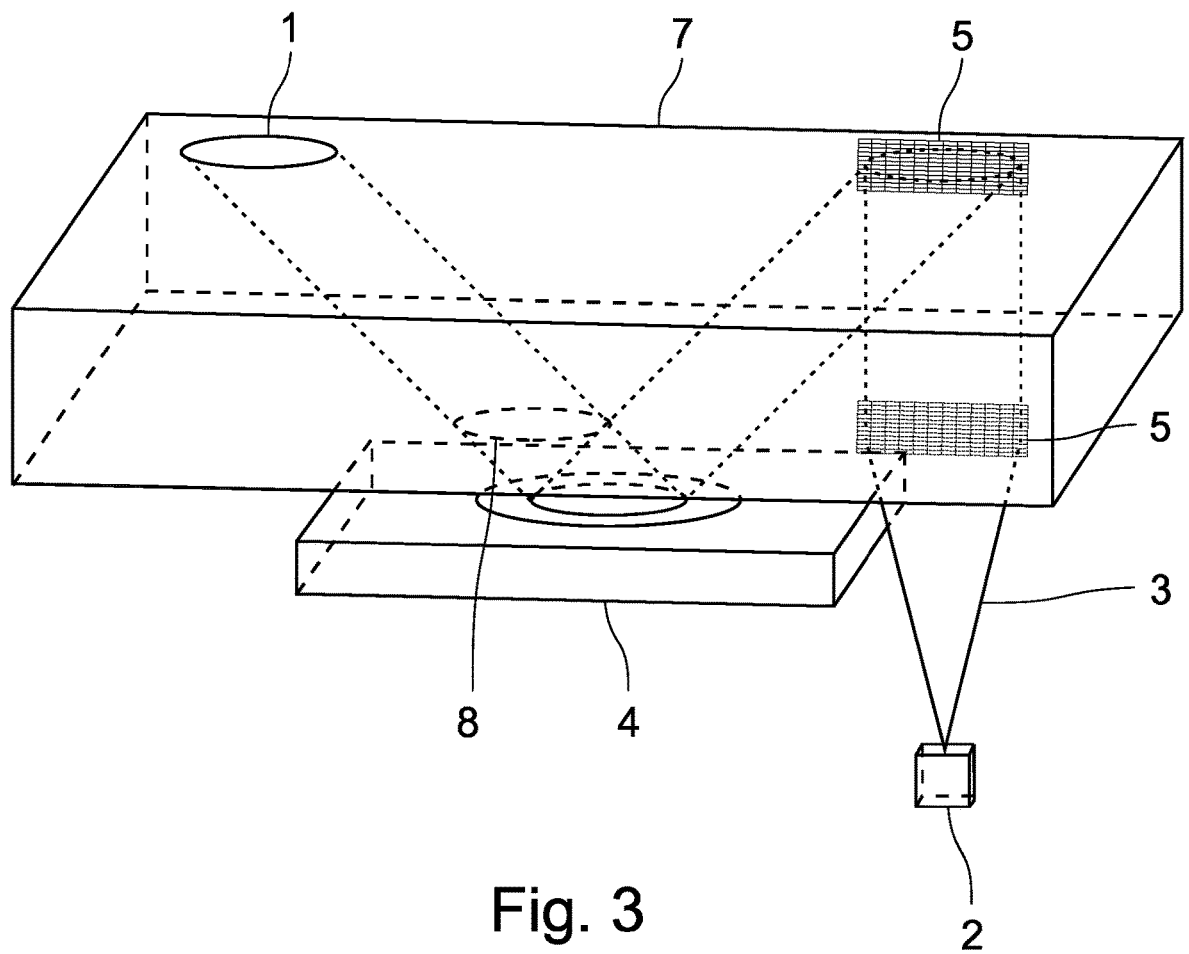
FIG. 3 a view of a fourth embodiment of the device for generating and displaying an image on the observation field, with the light source, two diffractive elements arranged on opposite outer sides of the waveguide, the microscanner and the beam path of the light bundle.

FIG. 3 shows a fourth embodiment of the device for generating and displaying the image on the observation field 1 with the light source 2, two diffractive elements 5, the microscanner 4 and the beam path of the light bundle 3. The diffractive elements 5 are constructed as gratings. The diffractive elements 5 are arranged on opposite sides of the waveguide 7, and the light bundle 3 is initially transmitted and collimated through the diffractive element 5 arranged on the underside of the waveguide 7. Subsequently, the light bundle 3 strikes the diffractive element 5 arranged on the upper side of the waveguide 7. The light bundle 3 is deflected or reflected in direction of the microscanner 4 by the diffractive element 5 arranged on the upper side of the waveguide 7. The microscanner 4 is arranged on the same side of the waveguide 7 as the light source 2 and scans the light bundle 3 over the observation field 1. Further, the in-coupling element 8 is provided at the waveguide 7 in order to couple the light bundle 3 coming from the microscanner 4 into the waveguide 7.

In principle, all of the diffractive elements 5 can also be installed in the waveguide 7. The arrangement of the diffractive elements 5 is a major factor for the installation space required for the device. For this reason, it is advantageous to arrange the diffractive elements 5 in or on the waveguide 7.

Figure 4:
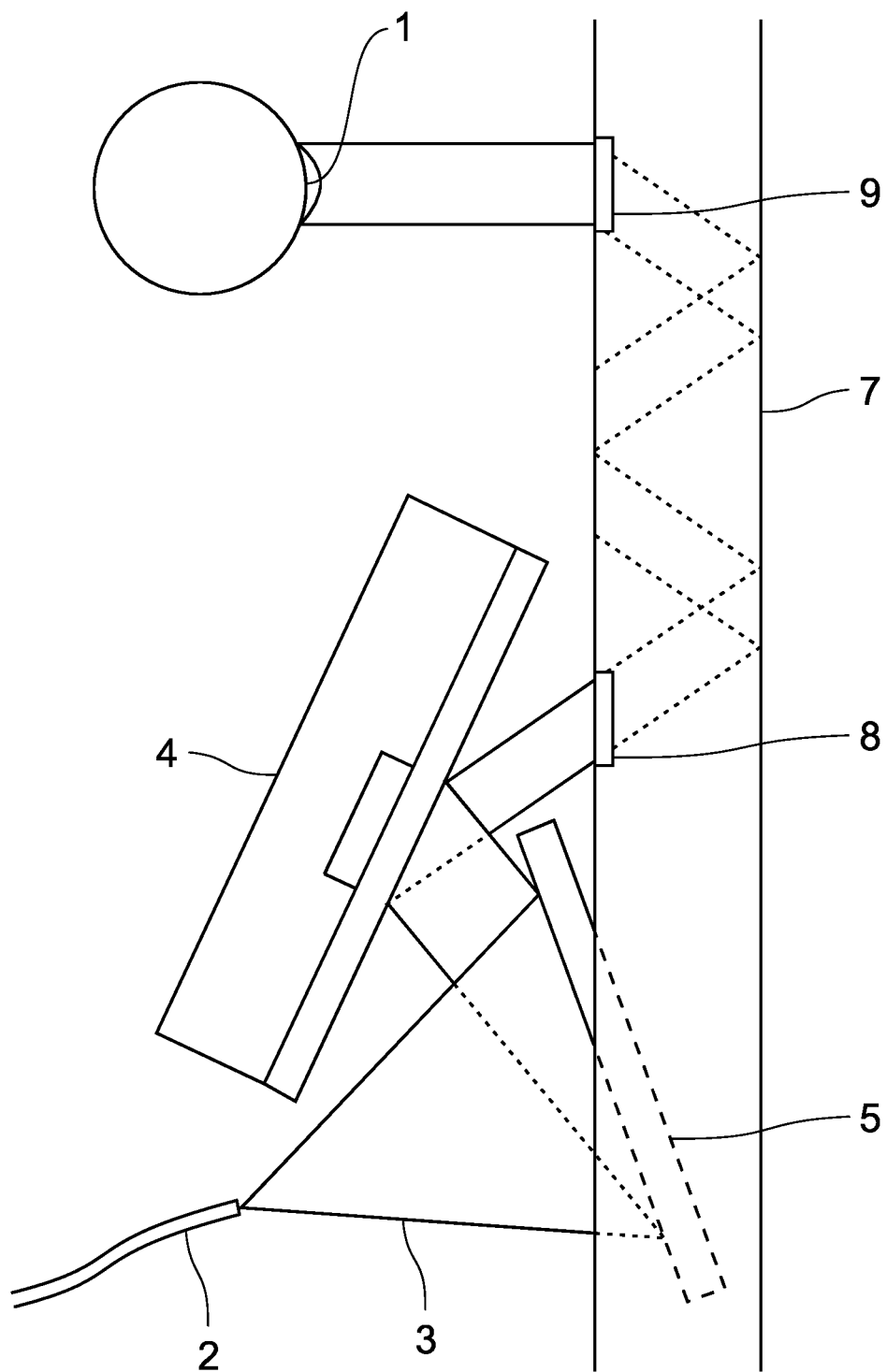
FIG. 4 a side view of a fifth embodiment of the device for generating and displaying an image on the observation field, with the light source, the diffractive element arranged at the waveguide, the microscanner and the beam path of the light bundle to an eye of a user.

FIG. 4 shows a fifth embodiment of the device for generating and displaying the image on the observation field 1 with the light source 2, the diffractive element 5 arranged at the waveguide 7, and the microscanner 4. The beam path of the light bundle 3 to an eye of a user is shown here schematically. The diffractive element 5 is arranged at the waveguide 7 and protrudes into the waveguide 7. In the fifth embodiment example, the light source 2 is formed as a fiber-coupled light source. The light bundle 3 emitted by the light source 2 is collimated by the diffractive element 5 and deflected in direction of the microscanner 4. The light bundle 3 is deflected in direction of an in-coupling element 8 and coupled into the waveguide 7 by the microscanner 4. The light bundle 3 propagates in the waveguide 7 through total internal reflection at the outer sides of the waveguide 7 until an out-coupling element 9 at which the light bundle 3 is coupled out of the waveguide 7 and propagates in direction of an observation field 1 which is the eye of a user.

Figure 5A:
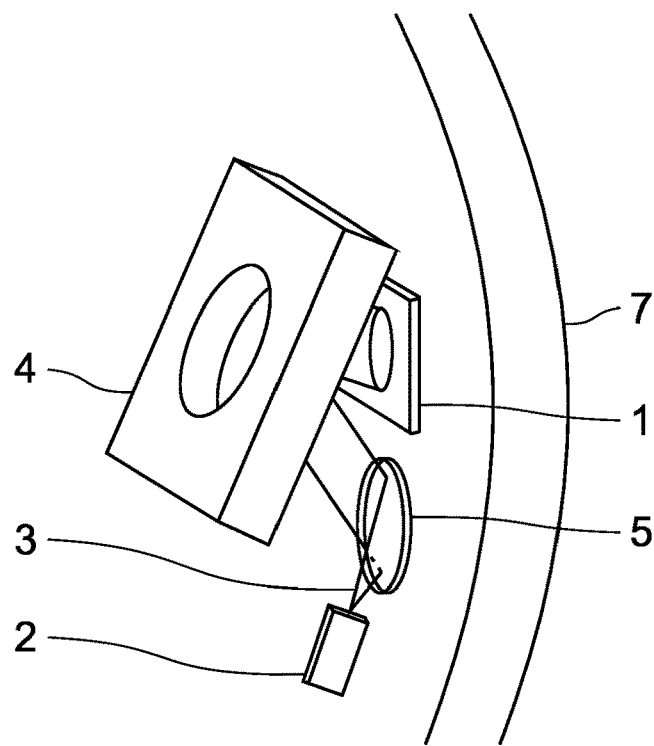
FIG. 5A a view of a sixth embodiment of the device for generating and displaying an image on the observation field, with the light source, the diffractive element arranged at the waveguide, the microscanner and the beam path of the light bundle.

FIG. 5A shows a sixth embodiment of the device for generating and displaying an image on the observation field 1. The light source 2 emits a light bundle 3 in direction of the diffractive element 5 arranged on the waveguide 7. Through the diffractive element 5 the light bundle 3 is deflected in direction of the microscanner 4 and collimated. The collimated light bundle 3 is deflected in direction of the observation field 1 and scanned over the observation field 1 by the microscanner 4.

Figure 5B:
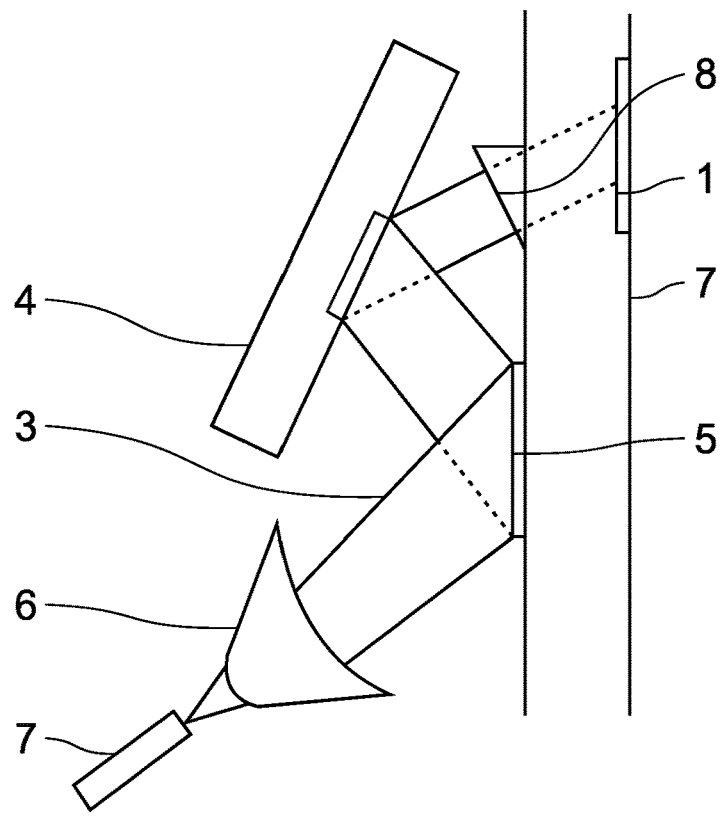
FIG. 5B a side view of a seventh embodiment of the device for generating and displaying an image on the observation field, with the light source, the diffractive element arranged at the waveguide, an additional optical element, the microscanner and the beam path of the light bundle.

FIG. 5B shows a seventh embodiment of the device for generating and displaying an image on the observation field 1. An additional optical element 6 which is configured to reduce a divergence of the at least one light bundle 3 is arranged downstream of the light source 2 in the beam path of the light bundle 3. The additional optical element 6 is constructed as a refractive element in the depicted seventh embodiment example. However, the additional optical element 6 can also be constructed as a diffractive element. The light bundle 3 subsequently strikes the diffractive element 5 and is collimated by the latter and deflected in direction of the microscanner 4. The light bundle 3 is deflected by the microscanner 4 in direction of the in-coupling element 8. The in-coupling element 8 is configured such that the light bundle 3 impinges substantially perpendicularly on a surface of the in-coupling element 8 and is coupled into the waveguide 7, where it impinges on the observation field 1.

Figure 6:
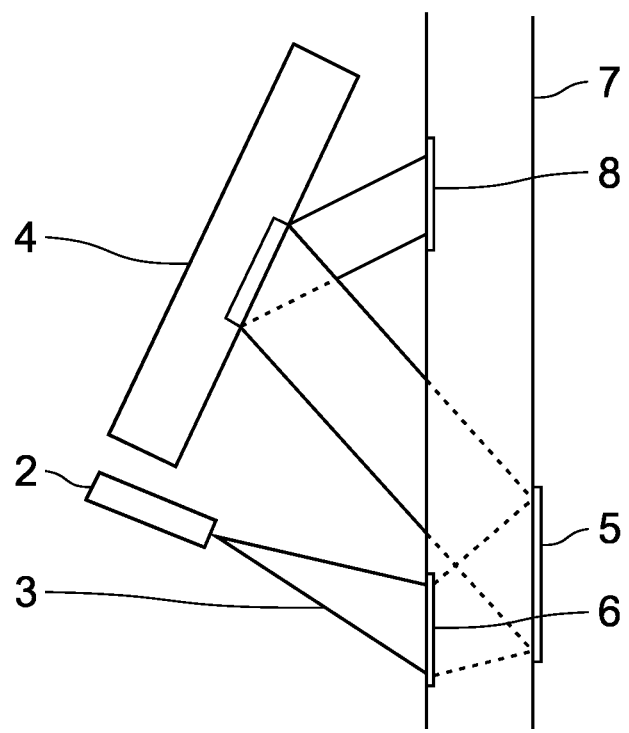
FIG. 6 a side view of an eighth embodiment of the device for generating and displaying an image on the observation field, with the light source, the diffractive element arranged at the waveguide, an additional optical element, the microscanner and the beam path of the light bundle.

FIG. 6 shows an eighth embodiment of the device for generating and displaying an image on the observation field 1. Here, in contrast to the seventh embodiment shown in FIG. 5B, the additional optical element 6 is configured as a diffractive element and arranged on an outer side inside of the waveguide 7.

Figure 7:
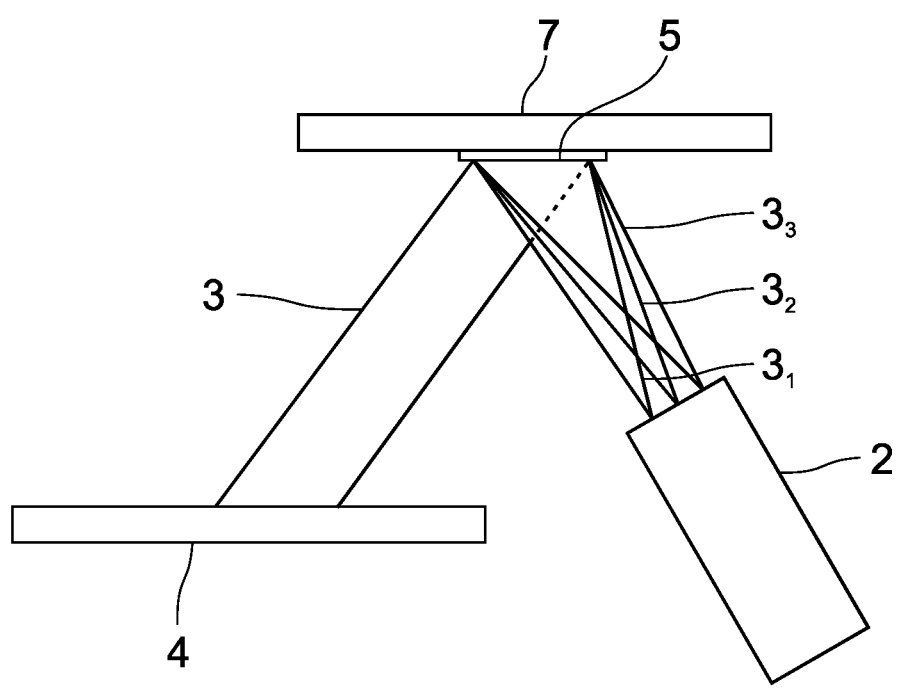
FIG. 7 a side view of a ninth embodiment of the device for generating and displaying an image on the observation field, with the light source, the diffractive element arranged at the waveguide, the microscanner and the beam path of the light bundle.

FIG. 7 shows a ninth embodiment of the device for generating and displaying an image on the observation field 1 with the light source 2, the diffractive element 5, the microscanner 4 and the beam path of three light bundles $3_1$, $3_2$, $3_3$. The light source 2 emits three light bundles $3_1$, $3_2$, $3_3$ in direction of the diffractive element 5. The light bundles $3_1$, $3_2$, $3_3$ are deflected by the diffractive element 5 in direction of the microscanner 4, collimated and combined in a single light bundle 3.

For purposes of better comprehension, FIGS. 1A, 2, 3, 4, 5A, 5B and 6 show only one of many possible beam paths that the light bundle 3 can take after deflection through the microscanner 4.

REFERENCE CHARACTERS 1 observation field
2 light source
3 (combined) light bundle
$3_1$ light bundle
$3_2$ light bundle
$3_3$ light bundle
4 microscanner
5 diffractive element
6 additional optical element
7 waveguide
8 in-coupling element
9 out-coupling element
10 cover glass

The invention claimed is:

1. A device for generating and displaying an image on an observation field provided for overlaying information and images, comprising:
    at least one light source for emitting at least one divergent light beam;
    a microscanner for variable deflection of the at least one light beam in direction of the observation field;
    a waveguide which is arranged in a beam path of the at least one light beam between the at least one light source and the microscanner; and
    at least one diffractive element for collimation of the at least one light beam;
    wherein the microscanner has at least one axis of rotation for a rotational oscillating movement for deflecting the at least one light beam, and the at least one diffractive element is arranged on or in the waveguide.

2. The device according to claim 1, wherein the at least one diffractive element is formed as grating.

3. The device according to claim 1, wherein the at least one diffractive element is configured to shape a beam cross section of the at least one light beam in order to reduce an ellipticity of the at least one light beam.

4. The device according to claim 1, wherein the at least one diffractive element is configured to influence astigmatisms of the at least one light beam.

5. The device according to claim 1, wherein an additional optical element which is arranged upstream of the at least one diffractive element in the beam path of the at least one light beam, which element is designed to reduce a divergence of the at least one light beam.

6. The device according to claim 1, wherein the at least one light source is formed as an edge emitter, a surface emitter or a fiber-coupled light source.

7. The device according to claim 1, wherein the at least one light source is configured to emit a plurality of light beams with spectral compositions differing from one another in pairs.

8. The device according to claim 1, wherein the at least one light source is formed to emit a plurality of light beams of identical spectral composition.

9. The device according to claim 7, wherein there is arranged between the at least one light source and the microscanner a diffractive element, which diffractive element is designed to combine the light beams, which are incident on the diffractive element at different angles in pairs, into a single light beam.

10. The device according to claim 1, wherein the microscanner is formed as a microelectromechanical system and is configured to bring about a nonlinear Lissajous projection on the observation field.

11. The device according to claim 1, wherein the waveguide is an eyeglass lens of augmented reality goggles.

12. Augmented reality goggles comprising a projection-device for generating and displaying images according to claim 1.

* * * * *